3,509,016
SELF-SEALING FUEL CELL WALL
Theodore A. Underwood, Cuyahoga Falls, William S.
Wickersham, Jr., North Canton, and Robert W. Sutton,
Tallmadge, Ohio, assignors to The Goodyear Tire &
Rubber Company, Akron, Ohio, a corporation of Ohio
Filed Feb. 16, 1966, Ser. No. 527,929
Int. Cl. B32b 27/40
U.S. Cl. 161—190                                                          5 Claims

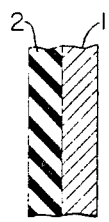
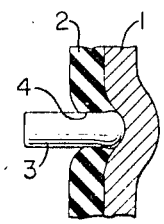
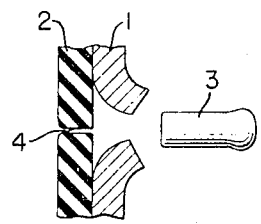
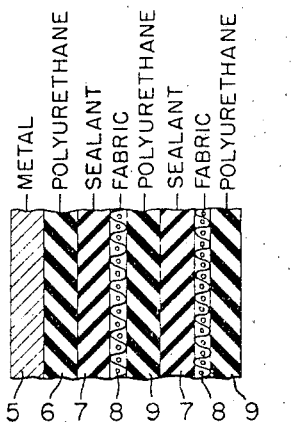
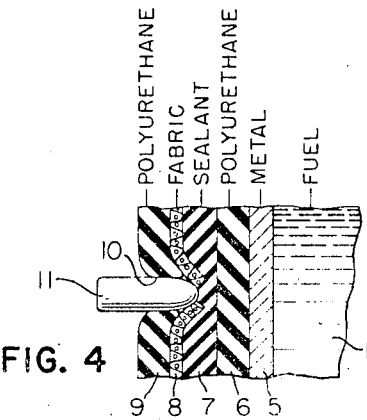
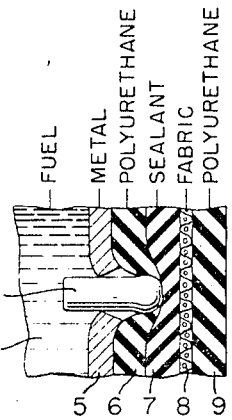
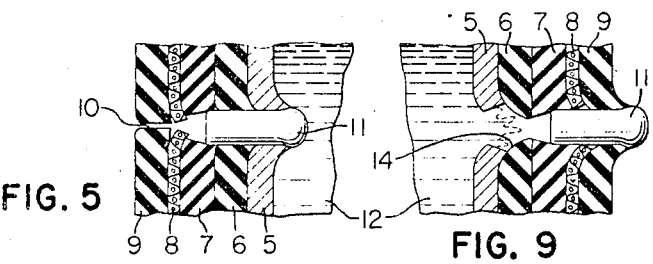
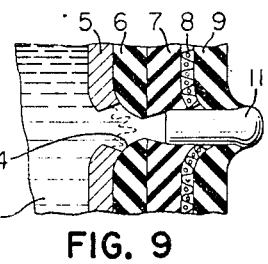
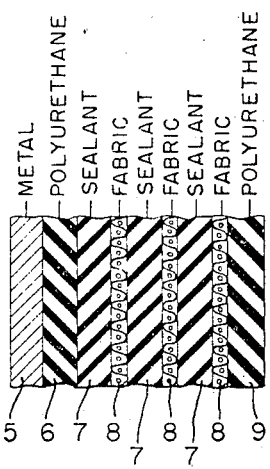
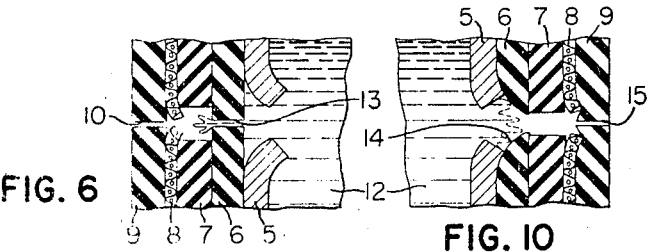
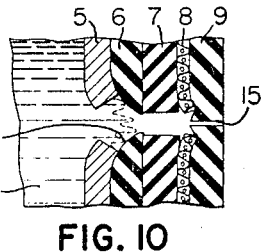
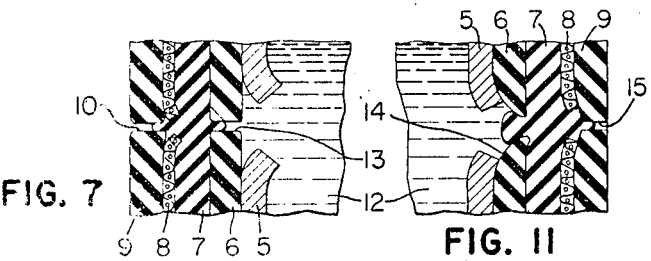
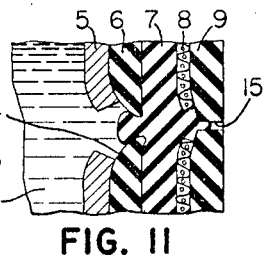

ABSTRACT OF THE DISCLOSURE

A self-sealing wall for fuel tanks or conduits having a substantially rigid supporting layer and at least one layer of elastomeric polyurethane. The polyurethane has sufficient resiliency to stretch and thereby permit passage of a projectile therethrough and then to contract to its original position to substantially seal the opening made by the projectile.

---

This invention relates to a self-sealing wall for fuel tanks or conduits.

In the past various wall structures have been devised to provide a self-sealing action to close bullet holes or other punctures in tanks for containing fuel, oil, or other liquids. Such a structure is particularly useful in fuel tanks of military vehicles which are often exposed to gunfire during combat.

A typical wall structure for self-sealing fuel tanks shown in the prior art consists of a gasoline resistant flexible lining, one or more sealing layers of uncured rubber or similar material which swells when exposed to gasoline, each sealing layer being backed up by a tear-resistant fabric layer and the outside of the tank surrounded by a rigid supporting shell. The principle of operation of this type of structure is that when a bullet penetrates the fuel tank, the fuel which leaks through the bullet hole activates the sealant layers causing them to swell and close the opening made by the bullet. Examples of fuel tanks of this general type may be seen in U.S. Patents 2,439,366, issued to L. McLaughlin; 2,440,965, issued to J. A. Merrill et al.; 2,446,815, issued to J. M. Davies et al.; and 2,446,811, issued to R. A. Crawford.

A primary object of this invention is to provide a self-sealing tank wall which does not rely entirely upon a fuel activated swelling wall layer to close a puncture therein.

A further object of this invention is to provide a self-sealing tank wall at least one layer of which stretches when an object punctures it and thereafter contracts to close the opening made by the object.

In the drawings:

FIGS. 1 through 3 show one embodiment of the invention;

FIGS. 4 through 7 show another embodiment of the invention with a bullet passing from the outside of a fuel tank through the wall to the inside;

FIGS. 8 through 11 show a similar wall embodiment to that shown in FIGS. 4 through 7 but with the bullet passing from the inside of the tank through the wall to the outside;

FIG. 12 shows a wall structure similar to the embodiment shown in FIGS. 4 through 11 but with additional layers of material; and FIG. 13 shows an embodiment similar to FIG. 12 but with a slightly different arrangement of the wall layers.

The simplest embodiment of the invention (FIGS. 1 through 3) shows a section through the wall of a fuel tank having a substantially rigid metal wall 1 and an outer sealing layer 2 of polyurethane.

The polyurethane layer 2 and those used in the other embodiments of this invention may be made by reacting an organic polyisocyanate with a reactive hydrogen-containing material having a molecular weight of about 700 to about 4000 and then curing the reaction product with a cross-linker as hereinafter described. Representative of the reactive hydrogen-containing materials are the broad classes of polyester polyols, polyether polyols, and hydrocarbon polyols. The polyester polyols which are particularly preferred are the esters of adipic acid with the lower glycols such as ethylene glycol, propylene glycol, and butylene glycol, and mixtures of these. The polyether polyols that are readily available that may be used are propylene ether glycol, polypropylene ether polyol, and polytetramethylene ether polyol.

Normally any of the well-known organic polyisocyanates useful for making castings may be utilized with toluene diisocyanate and methylene diphenyldiisocyanate being the one frequently used. The polyisocyanates are normally reacted about 1.2 to 2 mols per each mol of reactive hydrogen-containing material and then a cross-linker is added to react with part or substantially all the excess isocyanate. Thus, the crosslinker is frequently used in the amount of about .2 to .9 mol and preferably about 0.5 to .85 mol for each mol of reactive hydrogen-containing material.

Representaive of the many cross-linkers that may be utilized are the broad classes of monomeric polyols, organic diamines and alkylanolamines. Representaive members of these classes are ethylene glycols, propylene glycols, butane diols, methylene bis-chloroaniline, methylene dianiline, bis-amino phenyl sulfone and amino methyl propanol.

It should be appreciated that if these polyurethanes are to be applied as a reaction mixture it may be desirable to dissolve the various ingredients in suitable solvents such as the hydrocarbon solvents and the ketones and then the solution is applied preferably by casting in place but may also be applied by spraying, dipping, swabbing, or brushing.

The polyurethane layer 2 is cast in place on the outside of the tank wall 1 by use of a mold (not shown) surrounding the tank wall 1 and spaced therefrom in a manner well-known in the casting art. The liquid polyurethane is poured into the space between the mold and the wall and air cured. Curing may be accelerated by placing the cast structure in an oven and subjecting it to heat. This same casting technique is also useful when covering a fuel line with an outer layer of polyurethane or when making multiple layers of polyurethane interspersed between other layers of material as hereinafter described.

In FIG. 2 a bullet 3 is shown penetrating the polyurethane layer 2 and starting to deflect the metal tank wall 1. A hole 4 made by the passage of the bullet 3 through the layer 2 is distended to the diameter of the bullet but contracts (see FIG. 3) after the bullet has passed through to substantially close the hole 4 even though a large hole may remain in the metal wall. Depending upon the size of the bullet or projectile the resiliency of the polyurethane causes the hole 4 to close completely or at least to contract to such a small opening that it greatly reduces the fuel flow therethrough and minimizes the hazard of fire and engine failure from loss of fuel.

Another embodiment of the invention (FIGS. 4 through 11) involves a metal tank wall 5 covered with a layer 6 of polyurethane, a layer 7 of fuel activated swellable sealant material, a tear-resistant fabric layer 8 of nylon or other suitable material and an outer layer 9 of polyurethane similar to the layer 6. The sealant layer 7 is made of uncured or partially cured rubber or other sealants such as described in Patents 2,440,965 issued to J. A. Merrill et al. and 2,446,811 issued to R. A. Crawford. This arrangement provides a structure in which the swellable sealant layer 7 and the tear-resistant fabric layer 8 are sandwiched between layers 6 and 9 of polyurethane. By following the sequence of FIGS. 4 through 7 it may be seen that the opening 10 in the layer 9 of polyurethane stretches to the diameter of the bullet 11 as it passes therethrough (see FIG. 4). In FIG. 5 the bullet has passed through the layer 9, the fabric layer 8, and the sealant layer 7. At this stage in the penetration of the bullet the layer 9 of polyurethane has contracted to substantially close the opening 10 made by the bullet 11. The sealant layer 7 has not yet been exposed to fuel 12 from the tank so that the swelling action of this layer has not yet begun. In FIG. 6 the bullet has passed completely through the tank wall including the metal layer 5, and fuel 12 from the tank has started to pour through the opening 13 toward the polyurethane layer 6. In FIG. 7 the fuel activated swelling action of the sealant layer 7 has caused the portion of the sealant layer adjacent the bullet hole to swell and close any unsealed portion of openings 10 and 13 in layers 9 and 6 respectively.

The sequence of FIGS. 8 through 11 shows a sealing action similar to that shown by FIGS. 4 through 7 except that the bullet 11 in leaving the fuel tank first penetrates the metal layer 5 thereby causing it to flare outwardly thereby tending to hold the polyurethane layer 6 at least partially open at the hole 14 through which the bullet has passed. It will be noted, however, in FIG. 11 that any part of the hole 13 which remains open is sealed off by the swelling of sealant layer 7 once it is exposed to the fuel from the tank. The hole 15 in layer 9 contracts and serves as an outer back-up layer to the sealant layer 7 and materially reduces, or halts, the flow of the fuel therethrough. In comparing FIGS. 7 and 11 it will be observed that the polyurethane layers 9 and 6 in conjunction with the sealant layer 7 compensate for the difference in the effect of the bullet passing into the tank from that of the bullet passing out of the tank. In either situation the bullet hole is effectively sealed by the combined swelling action of the sealant layer 7 and the contracting action of the layers 9 and 6.

FIG. 12 shows a laminated structure similar to FIGS. 4 through 11 except that it has one additional sealant layer 7, fabric layer 8, and polyurethane layer 9. These additional layers may be desirable in certain applications where additional sealing protection is needed.

The embodiment shown in FIG. 13 shows three of the layers of sealant 7 and fabric 8 sandwiched between two layers of polyurethane 6 and 9.

Typical polyurethane compounds useful to form sealant layers 2, 6, and 9 in the structure of this invention are further illustrated but not limited by the following examples, where the parts and percentages are by weight unless otherwise indicated.

EXAMPLE 1

A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.8 was heated at 120° C. for one hour under a vacuum of 20 millimeters of mercury. To this polyester 23 parts by weight of 3,3' - dimethyl - 4,4' - diphenylene diisocyanate were added. The mixture was stirred for 30 minutes at 120° C. under a vacuum of 20 millimeters of mercury. Ortho dichlorobenzidine (6 parts by weight) was then added and mixed with the polyester and diisocyanate for one minute, after which the complete reaction mixture was poured into a fuel line mold and cured to form a polyurethane layer 7.

EXAMPLE 2

A mol of polytetramethylene ether glycol of about 1800 molecular weight was reacted with about 1.8 mols of 4,4'-diphenylene methane diisocyanate to form a prepolymer, then about .8 mol of methylene bis-orthochloroaniline was added to and mixed into the prepolymer. The resulting liquid reaction mixture was poured into a mold for a repair element before the reaction mixture set. The mold containing the liquid reaction mixture was placed in a 100° C. oven until the reaction mixture had set and cured.

While the reaction mixtures shown in Examples 1 and 2 will set up without the application of additional heat, it has been found expedient to place the cast product into a heated air oven or to heat the mold by some other means.

It may be seen that many variations in the arrangement of the sealant and fabric layers between the polyurethane and in the number of layers may be utilized without departing from the basic concept of the invention. It also will be realized that the rigid metal layer may be made of plastic or any other suitable material of sufficient strength and stiffness for the type of fuel tank being used. In addition to covering fuel tanks this same wall structure may be used equally well on fuel lines or other containers where self-sealing characteristics are desirable.

Various changes can be made in the illustrative embodiments shown herein without departing from the scope of the invention.

What is claimed is:
1. A self-sealing wall for containers and conduits adapted to seal punctures caused by projectiles comprising:
   (A) a substantially rigid supporting layer of liquid impervious material; and
   (B) at least one sealing layer of polyurethane adhered directly thereto,
      (1) said polyurethane layer being the reaction product of an organic polyisocyanate and a reactive hydrogen-containing material cured with a cross linker selected from the group consisting of monomeric polyols, organic diamines and alkylanolamines, and
      (2) said polyurethane layer having sufficient resiliency to stretch and thereby permit passage of a projectile therethrough and then to contract to its original position to substantially seal the opening made by the projectile.

2. The container wall of claim 1 wherein at least one layer of fuel activated swellable material backed by a tear resistant fabric layer is positioned between at least two polyurethane sealing layers of the type claimed in claim 1 with the polyurethane layers adapted to at least partially close the opening made by the projectile and the expansion of the swellable layers closing any remaining portion of the opening.

3. The container wall of claim 2 in which the rigid supporting layer is covered with a plurality of fabric-backed swellable layers alternately interspersed between the polyurethane layers.

4. The container wall of claim 2 in which the rigid supporting layer is covered with a plurality of fabric-backed swellable sealant layers, the entire group of which is positioned between an inner and an outer sealing layer of polyurethane.

5. The container wall of claim 2 in which the polyurethane layers are made of castable polyurethane.

References Cited

UNITED STATES PATENTS

| | | | |
|---|---|---|---|
| 2,438,965 | 4/1948 | Dasher | 161—405 X |
| 2,446,815 | 8/1948 | Davies et al. | 161—96 X |
| 3,091,551 | 5/1963 | Robertson | 117—132 X |
| 3,127,135 | 3/1964 | Burr et al. | |
| 3,129,014 | 4/1964 | Hutchison et al. | 161—405 X |
| 2,992,939 | 7/1961 | Larson et al. | 156—331 X |
| 3,042,545 | 7/1962 | Kienle et al. | |

FOREIGN PATENTS 762,082  11/1956  Great Britain.

HAROLD ANSHER, Primary Examiner

R. A. KILLWORTH, Assistant Examiner

U.S. Cl. X.R.

161—405